(12) United States Patent
Truong et al.

(10) Patent No.: US 7,110,606 B2
(45) Date of Patent: Sep. 19, 2006

(54) SYSTEM AND METHOD FOR A DIRECT COMPUTATION OF CUBIC SPLINE INTERPOLATION FOR REAL-TIME IMAGE CODEC

(76) Inventors: Trieu-Kien Truong, Dept. of Information Engineering, I-Shou University, Kaohsiung (TW); Tsen Chung Cheng, 1430 San Marino Ave., San Marino, CA (US) 91108

(*) Notice: Subject to any disclaimer, the term of this patent is extended or adjusted under 35 U.S.C. 154(b) by 216 days.

(21) Appl. No.: 10/865,660

(22) Filed: Jun. 10, 2004

(65) Prior Publication Data

US 2005/0018912 A1   Jan. 27, 2005

Related U.S. Application Data

(60) Provisional application No. 60/478,381, filed on Jun. 12, 2003.

(51) Int. Cl.
*G06K 9/36* (2006.01)
(52) U.S. Cl. .................................................... 382/233
(58) Field of Classification Search ........ 382/232–233, 382/300, 242, 248, 251
See application file for complete search history.

(56) References Cited

U.S. PATENT DOCUMENTS 5,822,456 A * 10/1998 Reed et al. ................. 382/232
5,892,847 A * 4/1999 Johnson ...................... 382/232
6,768,817 B1 * 7/2004 Cheng et al. ............... 382/232

OTHER PUBLICATIONS

Hou, Hsieh S and Andrews, Harry C., "Cubic Splines for Image Interpolation and Digital Filtering", IEEE Transactions on Acoustics, Speech, and Signal Processing, Dec. 1978, 508-517, vol. ASSP-26, No. 6.
Kolba, Dean P. and Parks, Thomas W., "A Prime Factor FFT Algorithm Using High-Speed Convolution", IEEE Transactions on Acoustics, Speech, and Signal Processing, Aug. 1977, 281-294, vol. ASSP-25, No. 4.
Truong, T.K., Wang, L.J., Reed, I.S., and Hsieh, W.S., "Image Data Compression Using Cubic Convolution Spline Interpolation", IEEE Transactions on Image Processing, Nov. 2000, 1988-1995, vol. 9, No. 11.
Wang, Lung-Jen, Hsieh, Wen-Shyong, Truong, Trieu-Kien, Reed, Irving, S., and Cheng, T.C., "A Fast Efficient Computation of Cubic-Spline Interpolation in Image Codec", Jun. 2001, 1189-1197, vol. 49, No. 6.

* cited by examiner

*Primary Examiner*—Sherali Ishrat
(74) *Attorney, Agent, or Firm*—Christie, Parker & Hale, LLP

(57) ABSTRACT

A cubic spline interpolation (CSI) method and apparatus for image compression by direct computation. Such a CSI method is used along with the JPEG standard to obtain a new CSI-JPEG encoder-decoder (Codec). In one embodiment, the present invention is a method and apparatus for a new CSI-JPEG codec enabling a pipelined compression method that is naturally suitable for hardware or firmware implementations.

3 Claims, 4 Drawing Sheets

A Modified JPEG Encoder

A Modified JPEG Decoder

SYSTEM AND METHOD FOR A DIRECT COMPUTATION OF CUBIC SPLINE INTERPOLATION FOR REAL-TIME IMAGE CODEC

CROSS REFERENCE TO RELATED APPLICATIONS

This patent application claims the benefit of the filing date of U.S. Provisional Patent Application Ser. No. 60/478,381, filed Jun. 12, 2003, and entitled "System and Method for A Direct Computation of Cubic Spline Interpolation for Real-Time Image Codec," the entire contents of which are hereby expressly incorporated by reference.

FIELD OF THE INVENTION

This invention relates to data compression. More specifically, the invention relates to a new cubic-spline interpolation (CSI) for both 1-D and 2-D signals to sub-sample signal and image compression data.

BACKGROUND OF THE INVENTION

In T. K. Truong, L. J. Wang, I. S. Reed, and W. S. Hsieh, "Image data compression using cubic convolution spline interpolation," *IEEE Trans. on Image Processing*, vol. 9, no. 11, pp. 1988–1995, November 2000 [1]; and L. J. Wang, W. S. Hsieh, T. K. Truong, I. S. Reed, and T. C. Cheng, "A fast efficient computation of cubic-spline interpolation in image codec," *IEEE Trans. on Signal Processing*, vol. 49, no. 6, pp. 1189–1197, June 2001 [2], the entire contents of which are hereby expressly incorporated by reference, a cubic spline interpolation (CSI) is developed in order to subsample image data to achieve compression. The CSI scheme is combined with the JPEG algorithm to develop a modified JPEG encoder-decoder, which obtains a higher compression ratio and a better quality of reconstructed image than the standard JPEG In the CSI algorithm developed in [1], a fast Fourier transform (FFT) algorithm used in the modified JPEG encoder, is applied to perform the circular convolution needed to compress and reconstruct image data.

Recently, the authors in [2] showed that if the size of compressed image is not chosen to be power of two, the usual 2-D FFT is not the best algorithm needed to obtain the compressed image values. To overcome this problem, the authors proposed the Winograd discrete Fourier transform (WDFT) with the overlap-save method instead of the FFT to implement the CSI scheme. The disadvantage of this faster CSI algorithm is the overlap-save method with its required boundary conditions. Thus this algorithm though faster is not readily realized as a real-time processor.

Therefore, there is a need for a method and apparatus for a faster and more efficient computation of a CSI for image signals.

SUMMARY OF THE INVENTION

In one embodiment, the present invention is a method performed by a computer for encoding a signal including defining a 1-D cubic-spline filter by $$R(t) = \begin{cases} (3/2)|t|^3 - (5/2)|t|^2 + 1, & 0 \le |t| < 1 \\ -(1/2)|t|^3 + (5/2)|t|^2 - 4|t| + 2, & 1 \le |t| < 2; \\ 0, & 2 \le |t|; \end{cases} \quad (1)$$

applying the filter to an input signal x(t) with $$y_j = \sum_{t=-2\tau+1}^{2\tau+1} r(t)x(t + j\tau), \quad 0 \le j \le n-1, \quad (3)$$

to compute $y_j$;

computing $B=[b_0, b_1, \ldots, b_{n-1}]_C$, where B denotes a cyclic matrix of size n×n, where $$b_k = \sum_{t=-2\tau+1}^{2\tau+1} r(t)r(t + k\tau), \quad 0 \le k \le n-1 \quad (4)$$

and where $b_0 = \alpha = 1.641$, $b_1 = b_{n-1} = \beta = 0.246$, $b_2 = b_{n-2} = \gamma = -0.07$, $b_3 = b_{n-3} = \delta = 0.004$, $b_4 = 0$, $b_5 = 0, \ldots, b_{n-4} = 0$;
computing $A = B^{-1}$, where A is a circular matrix of size n×n, where $$A = [a_0, a_1, a_2, a_3, a_4, a_5, a_6, \ldots, a_{n-6}, a_{n-5}, a_{n-4}, a_{n-3}, a_{n-2}, a_{n-1}]_C \quad (6)$$

and where $a_0 = 0.646$, $a_1 = a_{n-1} = -0.109$, $a_2 = a_{n-2} = 0.0467$, $a_3 = a_{n-3} = -0.014$, $a_4 = a_{n-4} = 0.0046$, $a_5 = a_{n-5} = -0.00148$, and $a_6 \cong a_7 \cong a_8 \cong \ldots \cong a_{n-6} \cong 0$; and
computing $$X = B^{-1}Y = AY \quad (7)$$

by computing $$x_j = \sum_{k=0}^{n-1} y_k \, a_{(j-k)_n}. \quad (8)$$

BRIEF DESCRIPTION OF THE DRAWINGS

The features of this invention will become more apparent from a consideration of the following detailed description and the drawings, in which.

DETAIL DESCRIPTION

A cubic spline interpolation (CSI) for 2-D signals is performed by a direct computation in order to encode and decode compression for image coding. A pipeline structure in an electronic system or an integrated chip (IC) can be used to implement this new CSI. Such a new CSI method can be used along with the JPEG standard to obtain a new CSI-JPEG encoder-decoder (Codec) while still maintaining a good quality of the reconstructed image using higher compression ratios. In one embodiment, the present invention is a method and apparatus for a new CSI-JPEG codec enabling a pipelined compression method that is naturally suitable for hardware or firmware implementations.

In one aspect, the present invention is a method performed by a computer for a direct computation of a cubic spline interpolation (CSI) for image signals. In another aspect, the present invention is an integrated chip (IC) that is configured to perform the above method. In yet another aspect, the present invention is a digital signal processor (DSP) that is configured to perform the above method.

Since a large number of zeros exists in the interval occupied by the filter coefficients of the CSI scheme (see, [1]), it is shown here that a direct computation, instead of using the FFT or WDFT algorithm, is developed for computing the required circular convolution for any size of image. This new algorithm is utilized to aid in the JPEG standard to obtain a new JPEG codec. The advantage of this new CSI procedure over all other CSI methods (see, [1], and [2]) is that it can be implemented by a pipeline structure and is naturally suitable for very large scale integration (VLSI) implementation. The comparison of the operations of this new algorithm, the CSI algorithm, and the WDFT CSI algorithm shows that the WDFT CSI algorithm requires fewer multiplications than both the new CSI and the conventional CSI algorithms. However, the new type of CSI algorithm requires less additions than both the WDFT CSI and the conventional CSI algorithms. Finally, computer runs show that for some images of size 640×480, for example, the computation time of this new CSI-JPEG encoder that is implemented by a direct computation requires only 1.28 sec compared with 1.52 sec for the typical CSI-JPEG encoder of [1] and 1.11 sec for the WDFT CSI-JPEG encoder of [2] with almost the same PSNR for the reconstructed image. That is, the new CSI-JPEG encoder requires 0.24 sec less time than the typical CSI-JPEG encoder and 0.17 sec less time than the WDFT CSI-JPEG encoder. In one embodiment, a pipeline structure can be developed to implement the new CSI-JPEG encoder. As a result, the new CSI-JPEG encoder described here is easier to implement in hardware or firmware than the previous compression algorithms.

Direct Computation of the CSI Encoder for 2-D Image Signal

It was shown in [1] that the idea of the CSI scheme is to recalculate the sampled values of the image data by means of the least-squares method that uses of cubic convolution interpolation (CCI) formula. In this section it is shown that a direct computation can be utilized for 2-D image data.

Figure 1:
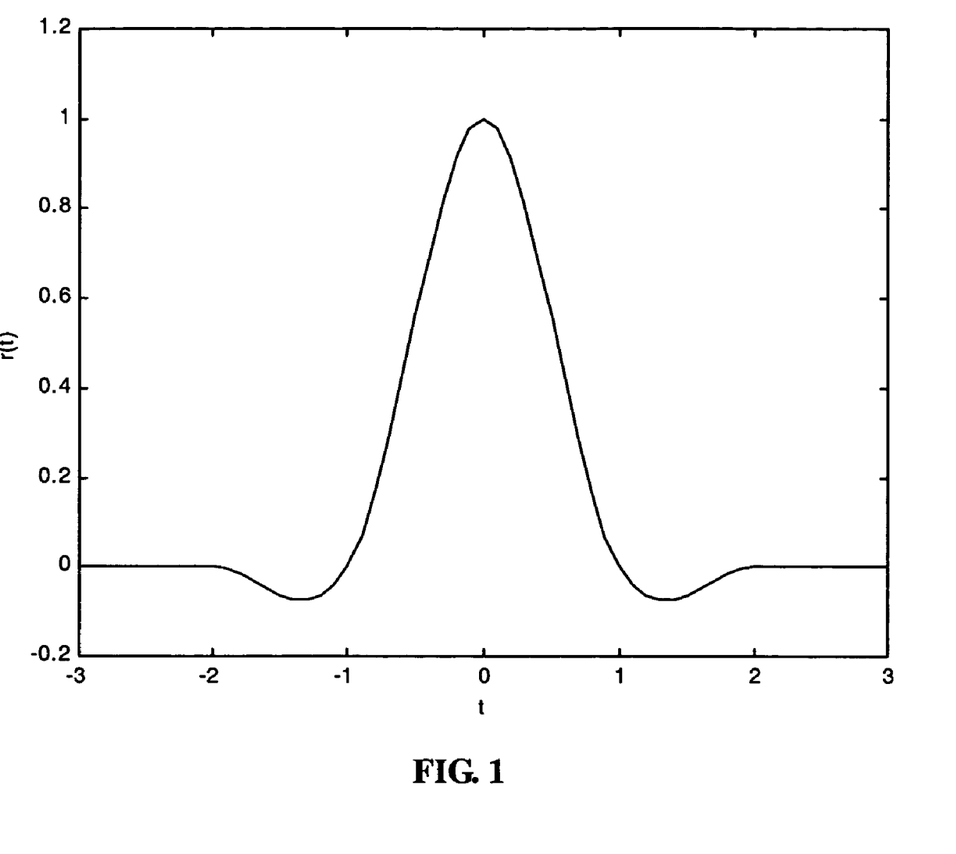
FIG. 1 is an exemplary One-dimensional (1-D) cubic convolution interpolation function.

To illustrate the encoding algorithm of the CSI method developed in [1] and [2], let $\tau$ be a fixed positive integer. Also, let $x(t)$ be periodic with period $N=n\tau$, where n is a positive integer. From S. Hou and H. C. Andrews, "Cubic splines for images interpolation and digital filtering," *IEEE Trans. Acoust., Speech, Signal Processing*, vol. ASSP-29, pp. 1153–1160, December 1981 [3], the entire content of which is hereby expressly incorporated by reference, the 1-D CCI function r(t) shown in FIG. 1, is defined by $$r(t) = \begin{cases} (3/2)|t|^3 - (5/2)|t|^2 + 1, & 0 \le |t| < 1 \\ -(1/2)|t|^3 + (5/2)|t|^2 - 4|t| + 2, & 1 \le |t| < 2 \\ 0, & 2 \le |t| \end{cases} \quad (1)$$

One defines the k-th shift function of the CCI function r(t) as $\psi_k(t)=r(t-k\tau)$ for $0 \le k \le n-1$, where r(t) is assumed to be a periodic function of period N. Also, let $x_i$ for $0 \le i \le n-1$ be the compressed values (coefficients) at the sampling points which represent the compressed data to be transmitted or stored. It follows from [1] that the set of equations as the circular convolution is given by $$y_j = \sum_{k=0}^{n-1} x_k b_{(j-k)_n}, \quad 0 \le j \le n-1 \quad (2)$$

where $(j-k)_n$ denotes the residue (j-k) mod n, $$y_j = \sum_{t=-2\tau+1}^{2\tau+1} r(t)x(t+j\tau) \quad 0 \le j \le n-1, \quad (3)$$

and $$b_k = \sum_{t=-2\tau+1}^{2\tau+1} r(t)r(t+k\tau). \quad 0 \le k \le n-1 \quad (4)$$

$y_j$ in (2) is the n-point circular convolution of the compressed data $x_k$ with the coefficients $b_k$ obtained by equation (4) for $0 \le k \le n-1$. It was shown in [1] that using the FCSI-JPEG, the subjective quality of the reconstructed image for $\tau=2$ is better than that of $\tau=3$. Thus, the special case $\tau=2$ is considered in this application. It is not difficult to show that the number of real multiplications and real additions that are needed to compute equation (3) is 9×n and 8×n, respectively. Because of the periodicity of the CCI function r(t), from equation (4), one obtains the coefficients $b_0=\alpha$, $b_1=b_{n-1}=\beta$, $b_2=b_{n-2}=\gamma$, $b_3=b_{n-3}=\delta$, $b_4=0$, $b_5=0$, ..., $b_{n-4}=0$, where $\alpha$, $\beta$, $\gamma$ and $\delta$ are obtained by the use of equation (8) in [1], and are shown below. These coefficients are the autocorrelation coefficients between two CSI functions. Now let $[\ ]^T$ denote the transpose of the column matrix X. Thus $y_j$ in equation (2) can be expressed in matrix form as follows:

$$Y=BX \quad (5)$$

where $Y=[y_0, y_1, \ldots, y_{n-1}]^T$, $X=[x_0, x_1, \ldots, x_{n-1}]^T$ and $B=[b_0, b_1, \ldots, b_{n-1}]_C$ denotes the cyclic matrix of size n×n. From [1], one obtains the coefficients $\alpha=1.641$, $\beta=0.246$, $\gamma=-0.07$ and $\delta=0.004$. It follows from [1] that the FFT can be used to solve (2) or (5) for $x_k$, where $0 \le k \le n-1$.

Because of a large number of zeros in the coefficients, i.e. $b_k$ for $0 \le k \le n-1$, computationally, the FFT algorithm of [1] is very inefficient to perform the circular convolution given in equation (2). In order to speed up the CSI algorithm for any size of the compressed image, a direct computation, instead of the FFT or WDFF in [2], is developed to perform the n-point circular convolution given in equation (2) for solving $x_k$ for $0 \le k \le n-1$. In other words, one can compute the n-point circular convolution of any size of sampling points in equation (2) by the means of a direct computation due to the large number of zeros of the coefficients, $b_k$, where $0 \le k \le n-1$. To illustrate this, one first finds the inverse matrix of B given in equation (5). It is well known from matrix theory that if B in equation (5) is a circular matrix, then the inverse matrix, namely $A=B^{-1}$ is also a circular matrix of size n×n. That is, $$A=[a_0,a_1,a_2,a_3,a_4,a_5,a_6, \ldots ,a_{n-6},a_{n-5}, a_{n-4},a_{n-3},a_{n-2}, a_{n-1}]_C \quad (6)$$

where $a_0=0.646$, $a_1=a_{n-1}=-0.109$, $a_2=a_{n-2}=0.0467$, $a_3=a_{n-3}=-0.014$, $a_4=a_{n-4}=0.0046$, $a_5=a_{n-5}=-0.00148$, and $a_6 \cong a_7 \cong a_8 \cong \ldots \cong a_{n-6} \cong 0$ which can be pre-computed. Note that the values of constants $a_i$ for $6 \leq i \leq n-6$ are within $10^{-6}$. It can be shown by computer simulation that these constants can be assumed to be zero without degrading the quality of the reconstructed image. The solution to $Y=BX$ given in equation (5) will then be expressed in matrix form as $$X = B^{-1}Y = AY \tag{7}$$

where $A=B^{-1}$ is a circulant matrix given in (6). (7) is thus reduced to the form $$x_j = \sum_{k=0}^{n-1} y_k \, a_{(j-k)_n} \tag{8}$$

Figure 2:
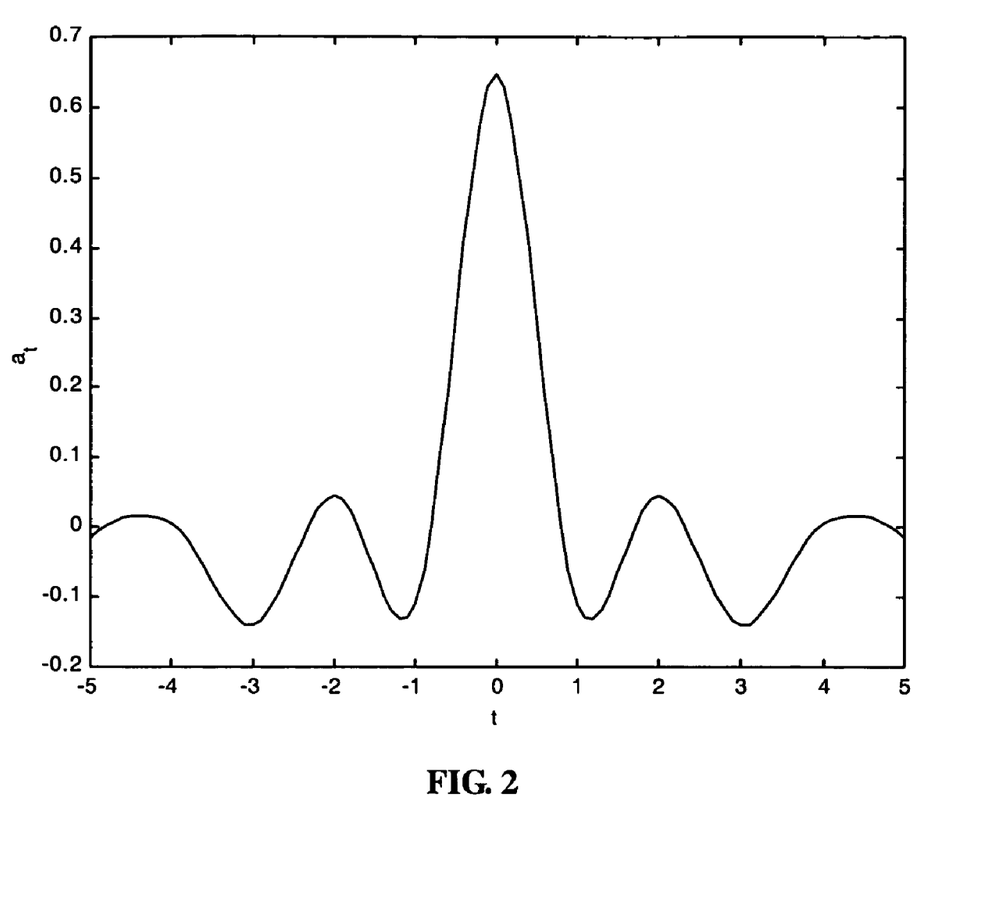
FIG. 2 is an exemplary 1-D compression filter, according to one embodiment of the present invention.

For $\tau=2$, since the coefficients $a_i$ for $0 \leq i \leq n-1$ given in equation (6) are periodic with period n, one can rearrange these coefficients as $a_{-5}=a_5=-0.0148$, $a_4=a_{-4}=0.0046$, $a_3=a_{-3}=-0.14$, $a_{-2}=a_2=0.0467$, $a_{-1}=a_1=-0.109$, and $a_0=0.646$. These coefficients shown in FIG. 2 are called the reconstructed filter coefficients. Because of the periodicity of the known data function $y_k=y_{k+n}$, the compressed data $x_j$ in equation (8) can be obtained by using the following linear correlation equation:

$$x_j = \sum_{k=-5}^{5} a_k y_{j+k} \quad 0 \leq j \leq n-1 \tag{9}$$

where the boundary conditions are $y_{-i}=y_{n-i}$ for $5 \leq i \leq 11$ and $y_i=y_{i-n}$ for $n \leq i \leq n+4$. In equation (8), $x_j$ can be obtained by correlating the known $y_j$ in equation (3) for $-5 \leq j \leq n+4$ with the reconstructed filter coefficients $a_k$ for $-5 \leq k \leq 5$. Computing $x_j$ in equation (9) involves n correlation coefficients of only 11 points for $\tau=2$. Hence, the number of real multiplications and additions of this direct filter computation needed to implement $x_j$ in equation (9) are $11 \times n$ and $10 \times n$, respectively. It is easy to see that the pipeline architecture can be developed to directly compute a linear correlation. Its modularity makes it well suitable for hardware or firmware implementation.

For the CSI algorithm implemented by the FFT algorithm, if n is a power of two, in this case, $n_1=n$. Otherwise, the data $y_j$ is expanded from n pixels to $n_1=2^l$ pixels by appending zeros to the edge of this data, where l is the smallest integer such that $2^l > n$. For a given n, the number of real multiplications and additions needed to implement $x_j$ in equation (9) is $4(2n_1 \log n_1 + n_1)$ and $2(2n_1 \log n_1 + n_1)$, respectively.

For the CSI algorithm implemented by the 9-point WDFT algorithm, if n is divided by 7, then $n=q \cdot 7 + r$, where q and r are the quotient and remainder of n, respectively. The number of the coefficients $y_j$, namely n is divided into $q+a$ overlapping 9-point sub-functions, where $a=1$ if $r-2 \geq 1$ and $a=0$, if $r-2 \leq 0$. Each 9-point sub-function is transformed by the direct use of the 9-point WDFT. It follows from D. P. Kolba and T. W. Parks, "A prime factor FFT algorithm using high-speed convolution," *IEEE Trans. Acoust., Speech, Signal Processing*, vol. ASSP-25, no. 4, pp. 281–294, August 1977 [4], the entire content of which is hereby expressly incorporated by reference, that the computation of the 9-point WDFT requires 8 real multiplies, 49 real adders, and 2 shifts. Thus, the number of real multiplications and additions used to perform $x_j$ in (9) is $(q+a)(2 \times 8 + 9)$ and $(q+a)(2 \times 49 + 9)$, respectively.

Since the decimation requires the computation of $y_j$ in equation (3) and $x_j$ in equation (9), the total numbers of real multiplies needed to compute the decimation using the FFT, the WDFT, and the direct algorithms are $9 \times n + 4(2n \log n + n)$, $9 \times n + (q+a)(2 \times 8 + 9)$, and $9 \times n + 11 \times n$, respectively. However, the total number of real adders needed to compute the decimation using the FFT, the WDFT, and the direct algorithms are $8 \times n + 2(2n \log n + n)$, $8 \times n + (q+a)(2 \times 49 + 9)$, and $8 \times n + 10 \times n$, respectively. The complexities of computing the decimation at different pixels using the three algorithms given above are summarized in Table I.

These three algorithms are compared in this table giving the number of real multiplications and additions needed to perform the decimation. From this table, one observes that the FFT algorithm required substantially much more real multiplications and additions than any of the other two methods. The comparison of the direct method and WDFT algorithm in Table I shows that the direct method requires about 1.59 times more real multiplications and 1.30 times less real additions than that of the WDFF algorithm, respectively. However, as mentioned earlier, a pipeline convolution algorithm can be developed to compute the linear convolution defined in equation (9). As a consequence, the direct method can be easier to implement in hardware or firmware than the FFT and WDFT algorithms.

Let $x(t_1,t_2)$ be a doubly periodic image signal of periods $n_1\tau$ and $n_2\tau$ with respect to the two integer variables $t_1$ and $t_2$, where $n_1$ and $n_2$ are also integers. The 2-D cubic spline function $r(t_1,t_2)$ is defined by $r(t_1,t_2)=r(t_1) \cdot r(t_2)$, where the 1-D CCI $r(t_i)$ is given in (1) and is also assumed to be a periodic function of period $n_i\tau$ for $i=1, 2$. Finally, let $\psi_{k_1,k_2}(t_1,t_2)=r(t_1-k_1\tau, t_2-k_2\tau)=r(t_1-k_1\tau) \cdot r(t_2-k_2\tau)=\psi_{k_1}(t_1) \cdot \psi_{k_2}(t_2)$ for $0 \leq k_i \leq n_i-1$, where $1 \leq i \leq 2$. Again, it is shown in [1] that the set of equations as 2-D circular convolution is $$y_{j_1,j_2} = \sum_{k_1=0}^{n_1-1} \sum_{k_2=0}^{n_2-1} x_{k_1,k_2} b_{(j_1-k_1)_{n_1},(j_2-k_2)_{n_2}} \tag{10}$$

for $0 \leq j_i \leq n_i - 1$ and $i = 1, 2$ where, for $0 \leq j_i \leq n_i - 1$ and $i=1, 2$, $x_{k_1,k_2}$ denotes the compressed values at the sampling points, $$y_{j_1,j_2} = \sum_{n_1=-2\tau+1}^{2\tau-1} \sum_{n_2=-2\tau+1}^{2\tau-1} x(m_1+j_1\tau, m_2+j_2\tau) r(m_1, m_2) \tag{11}$$

for $0 \leq j_i \leq n_i - 1$ and $i=1,2$ and $$b_{(j_1-k_1)_{n_1},(j_2-k_2)_{n_2}} = \sum_{m_1=-2\tau+1}^{2\tau-1} \sum_{m_2=-2\tau+1}^{2\tau-1} r(m_1+(j_1-k_1)\tau, m_2+ \tag{12}$$

$$(j_2-k_2)\tau) r(m_1, m_2)$$

Recall that $r(m_1,m_2)=r(m_1)r(m_2)$. Then equation (11) becomes $$y_{j_1,j_2} = \sum_{m_2=-2\tau-1}^{2\tau-1} \left( \sum_{m_1=-2\tau-1}^{2\tau-1} x(m_1+j_1\tau, m_2+j_2\tau_2)r(m_1) \right) r(m_2) \quad (13)$$

$$= \sum_{m_2=-2\tau+1}^{2\tau-1} y(j_1\tau, m_2+j_2\tau)r(m_2)$$

where $$y(j_1\tau, m_2+j_2\tau) = \sum_{m_1=-2\tau+1}^{2\tau-1} x(m_1+j_1\tau, m_2+j_2\tau)r(m_1).$$

To obtain $y_{j_1,j_2}$ in equation (13), we first convolve the 1-D CCI function $r(t)$ with each row of the data matrix $x(t_1,t_2)$. This resulting data matrix is then convolved by column with the same CCI function $r(t)$.

In equation (10), the 1-D convolution can be used to solve for $x_{k_1,k_2}$. To illustrate this, again since $r(t_1-k_1\tau,t_2-k_2\tau)=r(t_1-k_1\tau)r(t_2-k_2\tau)$ and $r(m_1,m_2)=r(m_1)r(m_2)$, then equation (12) becomes $$b_{(j_1-k_1)_{m_1},(j_2-k_2)_{n_2}} = \sum_{m_1=-2\tau+1}^{2\tau-1} \sum_{m_2=-2\tau+1}^{2\tau-1} r(m_1+(j_1-k_1)\tau)r(m_2+(j_2-k_2)\tau)r(m_1)r(m_2) \quad (14)$$

$$= b_{(j_1-k_1)_{n_1}} \cdot b_{(j_2-k_2)_{n_2}}$$

where $$b_{(j_1-k_1)_{ni}} = \sum_{m=-2\tau+1}^{2\tau-1} r(m_i+(j_i-k_i)\tau)r(m_i)$$

for $i=1, 2$. The substitution of equation (14) into equation (10) yields the following 2-D circular convolution:

$$y_{j_1,j_2} = \sum_{k_1=0}^{n_1-1} \sum_{k_2=0}^{n_2-1} x_{k_1,k_2} b_{(j_1-k_1)_{n_1}} \cdot b_{(j_2-k_2)_{n_2}} \quad (15)$$

Equation (15) can be decomposed into two $n_1$- and $n_2$-point cyclic convolutions as follows:

$$z_{j_1,k_2} = \sum_{k_1=0}^{n_1-1} x_{k_1,k_2} b_{(j_1-k_1)_{n_1}}, \quad (16)$$

$$y_{j_1,j_2} = \sum_{k_2=0}^{n_2-1} z_{j_1,k_2} b_{(j_2-k_2)_{n_2}} \quad (17)$$

where the filter coefficients $b_0, b_1, \ldots, b_{n_i-1}$ for $i=1, 2$ are given in [1].

To obtain $y_{j_1,j_2}$ in equation (16) one first convolves each now of the data matrix $x_{k_1,k_2}$ with the coefficients $b_0, b_1, \ldots, b_{n_1-1}$. The resulting data matrix is then convolved with the function coefficients $b_0, b_1, \ldots, b_{n_2-1}$. In order to find $x_{k_1,k_2}$ in equation (17) from the known data $y_{j_1,j_2}$ and the coefficients $b_0, b_1, \ldots, b_{n_i-1}$ for $i=1, 2$, equations (16) and (17) can be expressed explicitly in matrix from as follow:

$$z_{j_1,k_2}=[z_{0,k_2}, \ldots, z_{n_1-1,k_2}]^T=B_1[x_{0,k_2},x_{1,k_2}, \ldots x^n_{1-1,k_2}]^T \text{ for } 0 \leq k_2 \leq n_2-1 \quad (18)$$

$$y_{j_1,j_2}=[y_{j_1,0},y_{j_1,1}, \ldots, y_{j_1,n_2-1}]^T=B_2[z_{j_1,0},z_{j_1,1}, \ldots, z_{j_1,n_2-1}]^T \text{ for } 0 \leq j_1 \leq n_1-1 \quad (19)$$

where the matrices $B_i=[b_0,b_1,b_2, \ldots, b_{n_i-1}]^C$ for $i=1, 2$. In equation (15), the direct computation can be used to solve for $x_{k_1,k_2}$. To see this, multiplying both sides of equation (19) by the inverse matrix $B_2^{-1}$, yields $$z_{j_1,k_2}=[z_{j_1,0},z_{j_1,1}, \ldots, z_{j_1,n_2-1}]=B_2^{-1}[y_{j_1,0}, y_{j_1,1}, \ldots, y^i_{1,n_2-1}]^T \text{ for } 0 \leq j_1 \leq n_1-1 \quad (20)$$

Similarly, multiplying both sides of equation (18) by the inverse matrix $B_1^{-1}$, one obtains $$x_{k_1,k_2}=[x_{0,k_2},x_{1,k_2}, \ldots, x_{n_1-1,k_2}]=B_1^{-1}[z_{0,k_2}, z_{1,k_2}, \ldots, z_{n_1-1,k_2}]^T \text{ for } 0 \leq k_2 \leq n_2-1 \quad (21)$$

It follows from equations (20) and (21) that, to solve $x_{k_1,k_2}$ in equation (14), the reconstructed filter coefficients of FIG. 2 $a_1, a_2, \ldots, a_{n_2-1}$ are convolved with each column of the compressed matrix $Y_{j_1,j_2}$ to obtain $z_{j_1,k_2}$ then, the row of this resulting data matrix $z_{j_1,k_2}$ is convolved with the filter coefficients $a_1, a_2, \ldots, a_{n_2-1}$ to obtain the reconstructed image of $x_{k_1,k_2}$.

The new encoding method for the 2-D image data for $\tau=2$ is summarized in the following three steps:

1. Apply equation (13) with the 1-D CCI function given in (1) to the original image to find all of the coefficients $y_{j_1,j_2}$. In other words convolve the 1-D CCI function with each coordinate of the data matrix $x(m_1, m_2)$ to obtain the coefficients $y_{j_1,j_2}$.

2. From the known $b_j$, the circular matrix in equation (5) can be constructed. Then, compute the inverse matrix of B, namely A. Finally, the compressed filter coefficients $a_j$ for $-5 \leq j \leq 5$ can be found by the use of the matrix in equation (5).

3. Apply equation (20) and equation (21) with the compressed filter coefficients $a_j$ to obtained the reconstructed data $x_{k_1,k_2}$. In other words convolve the filter coefficients $a_j$ for $-5 \leq j \leq 5$ with each coordinate of the matrix $y_{j_1,j_2}$ to obtain the reconstructed image of $x_{k_1,k_2}$ Decoding Algorithm of the Compressed 2-D Signal In the decoding process, using the reconstructed values as the sampling points (e.g., the $x_{k_1,k_2}$ data), the reconstructed points between the sampling points are obtained by means of the CCI function given in equation (1). To do this, since the transformed image data $x_{k_1,k_2}$ for $0 \leq k_i \leq n_i-1$ and $i=1,2$ are known, the 2-D reconstructed image $s(t_1,t_2)$ is the 2-D convolution of the 2-D CCI function $r(t_1,t_2)=r(t_1) \cdot r(t_2)$ and the 2-D sampled waveform $x_{k_1,k_2}$. Since $r(t_1-k_1\tau,t_2-k_2\tau)=r(t_1-k_1\tau) \cdot r(t_2-k_2\tau)$, then, for $\tau=2$ in equation (12) in [1] becomes $$s(t_1, t_2) = \sum_{k_1=0}^{n_1-1} \sum_{k_2=0}^{n_2-1} x_{k_1,k_2} r(t_1-2k_1) r(t_2-2k_2) \quad (22)$$

Equation (22) can be decomposed into two $n_1$- and $n_2$-point convolutions as follows:

$$s(t_1, k_2) = \sum_{k_1=0}^{n_1-1} x_{k_1,k_2} r(t_1 - 2k_1) \text{ for } 0 \le k_2 \le n_2 - 1 \quad (23)$$

and $0 \le t_1 \le 2n_1$ and $$s(t_1, t_2) = \sum_{k_2=0}^{n_2-1} s(t_1, k_2) r(t_2 - 2k_2) \text{ for } 0 \le t_2 \le 2n_2 \quad (24)$$

Thus, from equations (23) and (24) the discrete data of each row can be interpolate from the transformed and compressed image data $x_{k_1,k_2}$ with a similar interpolation for the given discrete data of each column. The above method is a bilinear interpolation described in W. K. Pratt, Digital Images Processing, $2^{nd}$ ed., New York: Wiley, 1991 [5], the relevant contents of which are hereby expressly incorporated by reference.

Fast JPEG Encoder and Decoder

Figure 3:
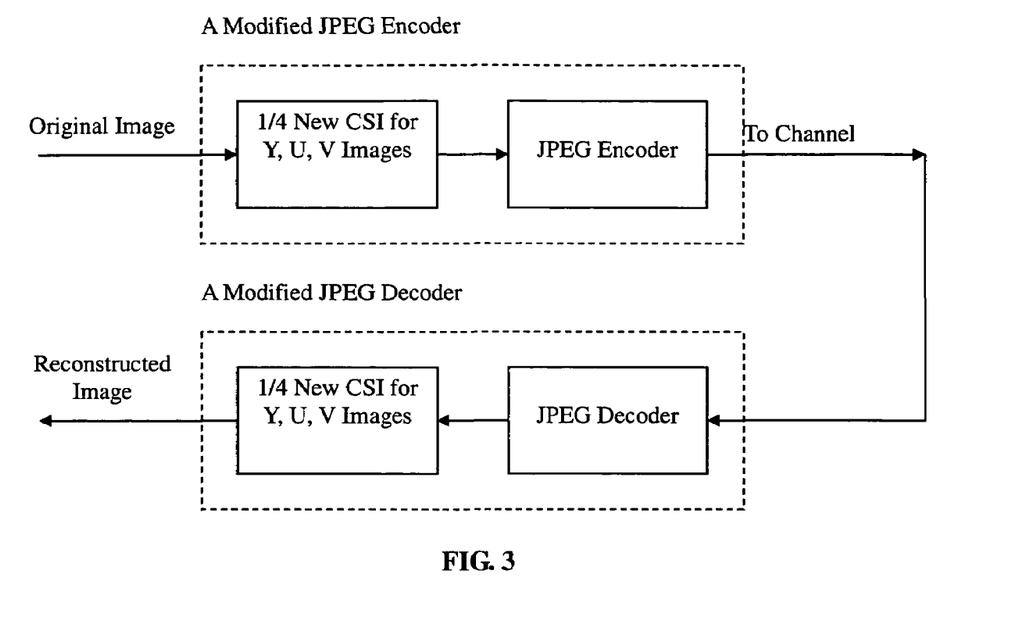
FIG. 3 is an exemplary JPEG encode/decoder, according to one embodiment of the present invention.

According to one embodiment of the present invention, a new JPEG encoder-decoder model includes the 1/4 new CSI scheme for preprocessing and the 1/4 CSI for the post-processing needed in the standard JPEG algorithm as shown in FIG. 3. In this model, an original image in RGB color space is converted to another preliminary image in YUV color space (see, for example, [5]) prior to the 1/4 CSI process.

There are two steps in the encoder. The first step is the pre-processing which uses the 1/4 new CSI scheme for the Y, U, and V images, individually. At the end of the 1/4 CSI computation, these separate Y, U, and V images are combined to yield one YUV image. The second step for post-processing uses the 1/4 CSI for the Y, U, and V images. Finally, the Y, U, and V images are combined to yield the YUV format. Then, this YUV images is converted to the final reconstructed RGB image.

Let $x_{k_1,k_2}$ and $s_{k_1,k_2}$ be the original and reconstructed images, respectively, and let $k_1$, $k_2$ for $0 \le k_1 \le M-1$ and $0 \le k_2 \le N-1$ be the index numbers that determine the vertical and horizontal positions of objects in the images. The mean square error (MSE) and the PSNR of the 2-D signal are given in [1], respectively.

Experimental results for the 2-D signal image are compared using the CSI scheme of [1], the fast CSI schemes given in [2], and the new CSI scheme given in this application. These results are computed and are shown in Table II. The PSNR of the 2-D signal are calculated for the standard images of size 512×512. That is, the original image is decimated by the disclosed CSI scheme to obtain data samples with a compression ratio of 4:1. In addition, the reconstructed values between the sampling points are interpolated by the 1/4 CCI in equation (1) to obtain the reconstructed image. It is seen from this table that the new CSI scheme has the same PSNR as the CSI and the FCSI schemes.

Table III lists the PSNR values of the RGB color Lena reconstructed image of size 512 by 512 at different compression ratios for the CSI-JPEG of [1], the FCSI-JPEG of [2], and the new CSI-JPEG codec disclosed in this application. From this table, one observes that for the same compression ratios, the PSNR of the image of the new CSI-JPEG codec are similar to the two other schemes.

Figure 4:
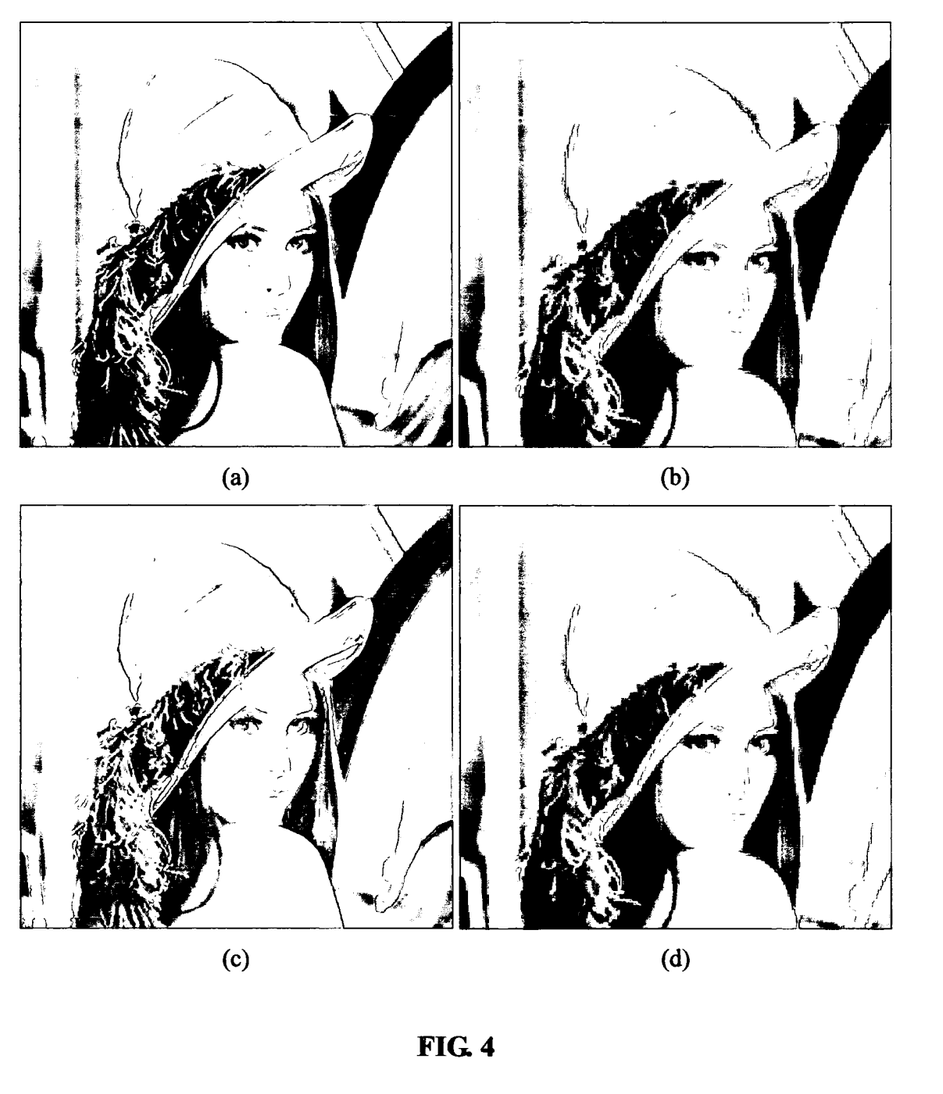
FIGS. 4(a)–4(d) are exemplary reconstructed images.

FIG. 4 shows the reconstructed image of Lena at the same compression ratio of 100:1, using the conventional CSI-JPEG, FCSI-JPEG, and the new CSI-JPEG codec. Clearly, the Lena image using our disclosed method indicates a subjective quality of reconstructed image similar to any of the other two methods. The image of FIG. 4 is of size 512 by 512 with a compression ratio 100:1. FIG. 4(a) is an original Lena image, FIG. 4(b) is an image reconstructed by the original CSI-JPEG with the PSNR of Y image equivalent to 35.08 dB, FIG. 4(c) shows an image reconstructed by the FCSI-JPEG with PSNR of Y image equivalent to 35.07 dB, and FIG. 4(d) depicts an image reconstructed by the new CSI-JPEG with PSNR of Y image equivalent to 34.51 dB.

Finally, the new CSI-JPEG codec was implemented on a 800-MHz Intel Pentium III personal computer using a C program. The computation time of this new simplified algorithm is given in Table IV. It follows from Table IV that the new CSI-JPEG encoder requires 1.28 sec compared with 1.11 sec for the FCSI-JPEG encoder and 1.52 sec for the CSI-JPEG encoder, respectively. Although, the new CSI-JPEG decoder requires almost the same computation time as the other two decoders, the new CSI-JPEG encoder requires 0.17 sec more time and 0.24 sec less time than the FCSI-JPEG decoder and the CSI-JPEG decoder, respectively.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

TABLE 1

COMPLEXITY OF COMPUTING DECIMATION USING FFT, WDFT AND DIRECT METHODS

| | FFT Algorithm | | WDFT Algorithm | | Direct Algorithm | |
|---|---|---|---|---|---|---|
| n | No. Real Mult. | No. Real Add. | No. Real Mult. | No. Real Add. | No. Real Mult. | No. Real Add. |
| 640 | 22688 | 13584 | 8110 | 15178 | 12800 | 11520 |
| 480 | 16536 | 9948 | 6020 | 11116 | 9600 | 8640 |
| 320 | 10573 | 6407 | 4130 | 7910 | 6400 | 5760 |
| 240 | 7690 | 4685 | 3060 | 5771 | 4800 | 4320 |
| 352 | 11747 | 7106 | 4468 | 8380 | 7040 | 6336 |
| 288 | 9410 | 5713 | 3592 | 6798 | 5760 | 5184 |
| 512 | 17753 | 10668 | 6458 | 12014 | 10240 | 9216 |

TABLE II

PSNR (dB) OF 2-D IMAGE OF SIZE 512 BY 512 WITH COMPRESSION RATIO 4:1 FOR $\tau = 2$

| Image | CSI [1] | FCSI [2] | NEW CSI |
|---|---|---|---|
| Peppers | 33.21 | 33.20 | 32.89 |
| Lake | 30.87 | 30.86 | 30.51 |
| Couple | 30.51 | 30.36 | 30.23 |
| Crowd | 33.86 | 33.86 | 33.42 |
| Lena | 35.08 | 35.07 | 34.51 |

TABLE III

PSNR VALUE AT DIFFERENT COMPRESSION RATIOS OF 2D IMAGE OF SIZE 512 BY 512 for CSI-JPEG, FCST-JPEG, AND NEW CSI-JPEG CODE

| | PSNR (dB) | | | | | | | | |
|---|---|---|---|---|---|---|---|---|---|
| Compress | CSI-JPEG | | | FCSI-JPEG | | | NEW CSI-JPEG | | |
| Ratio | Y | U | V | Y | U | V | Y | U | V |
| 125:1 | 30.27 | 34.89 | 35.00 | 30.37 | 34.98 | 35.09 | 29.89 | 33.55 | 34.56 |
| 100:1 | 31.20 | 35.66 | 35.85 | 31.15 | 35.64 | 35.67 | 30.92 | 35.42 | 35.66 |
| 75:1 | 32.15 | 36.45 | 36.42 | 32.14 | 36.41 | 36.33 | 32.02 | 36.10 | 36.37 |
| 50:1 | 33.36 | 37.42 | 37.32 | 33.51 | 37.51 | 37.24 | 33.28 | 37.32 | 37.28 |

TABLE IV

COMPUTATION TIME (SECONDS) OF THE COLOR IMAGE OF SIZE 640 BY 480 AT THE COMPRESSION RATIO OF 100:1 IMPLEMENTED ON A 800 MHz INTEL PENTIUM III PERSONAAL COMPUTER.

| | Encoder | | | Decoder | | |
|---|---|---|---|---|---|---|
| | Decimation | JPEG Encoder | Total | JPEGB Decoder | Interpolation | Total |
| CSI-JPEG | 0.68 | 0.84 | 1.52 | 0.23 | 0.1 | 0.33 |
| FCSI-JPEG | 0.27 | 0.84 | 1.11 | 0.23 | 0.08 | 0.31 |
| nCSI-JPEG | 0.44 | 0.84 | 1.28 | 0.23 | 0.1 | 0.33 |

What is claimed is:

1. A method performed by a computer for encoding a one-dimensional (1-D) image signal x(t), the image signal being a periodic signal with period $N=n\tau$, where n is an integer and $\tau$ is a fixed positive integer, the method comprising:

defining a 1-D cubic-spline filter r(t) by $$r(t) = \begin{cases} (3/2)|t|^3 - (5/2)|t|^2 + 1, & 0 \le |t| < 1 \\ -(1/2)|t|^3 + (5/2)|t|^2 - 4|t| + 2, & 1 \le |t| < 2; \\ 0, & 2 \le |t|; \end{cases} \quad (1)$$

applying the filter to the image signal x(t) with $$y_j = \sum_{t=-2\tau+1}^{2\tau+1} r(t)x(t+j\tau), \quad 0 \le j \le n-1, \quad (3)$$

to compute $y_j$ where $y_j$ is an n-point circular correlation of filter r(t) and image signal x(t);

computing a cyclic matrix of size n×n $B=[b_0, b_1, \ldots, b_{n-1}]_C$, where matrix coefficients $b_k$ are the autocorrelation coefficients for $0 \le k \le n-1$ between two filters r(t) and r(t+k$\tau$), $$b_k = \sum_{t=-2\tau+1}^{2\tau+1} r(t)r(t+k\tau), \quad 0 \le k \le n-1 \quad (4)$$

and where for $\tau+2$, $b_0=\alpha=1.641$, $b_1=b_{n-1}=\beta=0.246$, $b_2=b_{n-2}=\gamma=-0.07$, $b_3=b_{n-3}=\delta=0.004$, $b_{4=0}$, $b_{5=0}$, ..., $b_{n-4}=0$;

computing a reconstructed filter by computing inverse matrix of B, $A=B^{-1}$, where the reconstructed filter A is a circular matrix of size n×n, where $$A=[a_0,a_1,a_2,a_3,a_4,a_5,a_6, \ldots ,a_{n-6},a_{n-5},a_{n-4},a_{n-3},a_{n-2}, a_{n-1}]_C \quad (6)$$

and where the coefficients of the reconstructed filter A are $a_0=0.646$, $a_1=a_{n-1}=-0.109$, $a_2=a_{n-2}=0.0467$, $a_3=a_{n-3}=-0.014$, $a_4=a_{n-4}=0.0046$, $a_5=a_{n-5}=-0.00148$, and $a_6 \cong a_7 \cong a_8 \cong \ldots \cong a_{n-6} \cong 0$; and computing $$X=B^{-1}Y=AY \quad (7)$$

where $Y=[y_0,y_1, \ldots ,y_{n-1}]^T$ is tranpose of row vector Y and $X=[x_0,x_1, \ldots ,x_{n-1}]^T$ is transpose of the row vector X, by computing a circular convolution:

$$x_j = \sum_{k=0}^{n-1} y_k\, a_{(j-k)_n}, \quad (8)$$

where $x_j$ are convolution coefficients between time samples $y_k$ and $a_k$ for $0 \le k,j \le n-1$ and are the encoded values of the image signal x(t) at sampling points and where $(j-k)_n$ denotes a residue (j–k) module n.

2. A JPEG decoder for decoding a one-dimensional (1-D) image signal x(t), the image signal being a periodic signal with period $N=n\tau$, where n is an integer and $\tau$ is a fixed positive integer, comprising:

means for defining a 1-D cubic-spline filter r(t) by $$r(t) = \begin{cases} (3/2)|t|^3 - (5/2)|t|^2 + 1, & 0 \le |t| < 1 \\ -(1/2)|t|^3 + (5/2)|t|^2 - 4|t| + 2, & 1 \le |t| < 2; \\ 0, & 2 \le |t|; \end{cases} \quad (1)$$

means for applying the filter to the image signal x(t) with $$y_j = \sum_{t=-2\tau+1}^{2\tau+1} r(t)x(t+j\tau), \quad 0 \le j \le n-1, \quad (3)$$

to compute $y_j$ where $y_j$ is an n-point circular correlation of filter r(t) and image signal x(t);

means for computing a cyclic matrix of size n×n $B=[b_0, b_1, \ldots, b_{n-1}]_C$, where matrix coefficients $b_k$ are the autocorrelation coefficients for $0 \le k \le n-1$ between two filters r(t) and r(t-kτ), $$b_k = \sum_{t=-2\tau+1}^{2\tau+1} r(t)r(t+k\tau), \quad 0 \le k \le n-1 \quad (4)$$

and where for τ+2, $b_0=\alpha=1.641$, $b_1=b_{n-1}=\beta=0.246$, $b_2=b_{n-2}=\gamma=-0.07$, $b_3=b_{n-3}=\delta=0.004$, $b_4=0$, $b_5=0, \ldots$, $b_{n-4}=0$;

means for computing a reconstructed filter by computing inverse matrix of B, $A=B^{-1}$, where the reconstructed filter A is a circular matrix of size n×n, where $$A=[a_0,a_1,a_2,a_3,a_4,a_5,a_6,\ldots,a_{n-6},a_{n-5}, a_{n-4},a_{n-3},a_{n-2}, a_{n-1}]_C \quad (6)$$

and where coefficients of the reconstructed filter A are $a_0=0.646$, $a_1=a_{n-1}=-0.109$, $a_2=a_{n-2}=0.0467$, $a_3=a_{n-3}=-0.014$, $a_4=a_{n-4}=0.0046$, $a_5=a_{n-5}=-0.00148$, and $a_6 \cong a_7 \cong a_8 \cong \ldots \cong a_{n-6} \cong 0$; and means for computing $$X=B^{-1}Y=AY \quad (7)$$

where $Y=[y_0,y_1,\ldots,y_{n-1}]^T$ is transpose of row vector Y and $X=[x_0,x_1,\ldots,x_{n-1}]^T$ is transpose of the row vector X, by computing a circular convolution:

$$x_j = \sum_{k=0}^{n-1} y_k a_{(j-k)_n}, \quad (8)$$

where $x_j$ are convolution coefficients between time samples $y_k$ and $a_k$ for $0 \le k,j \le n-1$ and are the encoded values of the image signal x(t) at sampling points and and where $(j-k)_n$ denotes a residue (j-k) module n.

3. A digital signal processor (DSP) having stored thereon a set of instructions including instruction for processing a one-dimensional (1-D) image signal x(t), the image signal being a periodic signal with period N=nτ, where n is an integer and τ is a fixed positive integer, the instruction when executed by the DSP perform the steps of:

defining a 1-D cubic-spline filter r(t) by $$r(t) = \begin{cases} (3/2)|t|^3 - (5/2)|t|^2 + 1, & 0 \le |t| < 1 \\ -(1/2)|t|^3 + (5/2)|t|^2 - 4|t| + 2, & 1 \le |t| < 2; \\ 0, & 2 \le |t|; \end{cases} \quad (1)$$

applying the filter to the image signal x(t) with $$y_j = \sum_{t=-2\tau+1}^{2\tau+1} r(t)x(t+j\tau), \quad 0 \le j \le n-1, \quad (3)$$

to compute $y_j$ where $y_j$ is an n-point circular correlation of filter r(t) and image signal x(t);

computing a cyclic martix of size n×n $B=[b_0, b_1, \ldots, b_{n-1}]_C$, where matrix coefficients $b_k$ are the autocorrelation coefficients for $0 \le k \le n-1$ between two filters r(t) and r(t+kτ), $$b_k = \sum_{t=-2\tau+1}^{2\tau+1} r(t)r(t+k\tau). \quad 0 \le k \le n-1 \quad (4)$$

and where $b_0=\alpha=1.641$, $b_1=b_{n-1}=\beta=0.246$, $b_2=b_{n-2}=\gamma=0.07$, $b_3=b_{n-3}=\delta=0.004$, $b_4=0$, $b_5=0, \ldots$, $b_{n-4}=0$;

computing a reconstructed filter by computing inverse matrix of B, $A=B^{-1}$, where the reconstructed filter A is a circular matrix of size n×n, where $$A=[a_0,a_1,a_2,a_3,a_4,a_5,a_6,\ldots,a_{n-6},a_{n-5}, a_{n-4},a_{n-3},a_{n-2}, a_{n-1}]_C \quad (6)$$

and where the coefficients of the reconstructed filter A are $a_0=0.646$, $a_1=a_{n-1}=-0.109$, $a_2=a_{n-2}=0.0467$, $a_3=a_{n-3}=-0.014$, $a_4=a_{n-4}=0.0046$, $a_5=a_{n-5}=-0.00148$, and $a_6 \cong a_7 \cong a_8 \cong \ldots \cong a_{n-6} \cong 0$; and computing $$X=B^{-1}Y=AY \quad (7)$$

where $Y=[y_0,y_1,\ldots,y_{n-1}]^T$ transpose of the row vector Y and $X=[X_0,x_1,\ldots,x_{n-1}]^T$ is transpose of the row vector X, by computing a circular convolution:

$$x_j = \sum_{k=0}^{n-1} y_k a_{(j-k)_n}, \quad (8)$$

where $x_j$ are convolution coefficients between time samples $y_k$ and $a_k$ for $0 \le k,j \le n-1$ and are the encoded values of the image signal x(t) at sampling points and where $(j-k)_n$ denotes a residue (j-k) module n.

* * * * *